US007837259B2

(12) United States Patent
Staab et al.

(10) Patent No.: US 7,837,259 B2
(45) Date of Patent: Nov. 23, 2010

(54) SEAT, IN PARTICULAR AIR PASSENGER SEAT

(75) Inventors: Franz Staab, Salem (DE); Frank Herold, Potsdam (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 11/920,241

(22) PCT Filed: Apr. 19, 2006

(86) PCT No.: PCT/EP2006/003555

§ 371 (c)(1),
(2), (4) Date: Apr. 29, 2008

(87) PCT Pub. No.: WO2006/122626

PCT Pub. Date: Nov. 23, 2006

(65) Prior Publication Data

US 2009/0102256 A1    Apr. 23, 2009

(30) Foreign Application Priority Data

May 13, 2005    (DE) ...................... 10 2005 022 165

(51) Int. Cl.
*A47C 13/00* (2006.01)
*B64D 11/00* (2006.01)
*B64D 11/06* (2006.01)

(52) U.S. Cl. .................. 297/118; 244/118.5; 244/118.6

(58) Field of Classification Search ............ 297/216.11, 297/216.13, 216.16, 216.19, 118; 244/118.5, 244/118.6

See application file for complete search history.

(56) References Cited

U.S. PATENT DOCUMENTS

| 2,514,798 | A | * | 7/1950 | Rowe | .......................... 297/95 |
| 3,037,812 | A | | 6/1962 | Monroe | |
| 3,588,172 | A | * | 6/1971 | McGregor | ............. 297/362.13 |

(Continued)

FOREIGN PATENT DOCUMENTS

DE    1 024 815    2/1958

(Continued)

*Primary Examiner*—Rodney B White
*Assistant Examiner*—James Alex
(74) *Attorney, Agent, or Firm*—Posz Law Group, PLC

(57) ABSTRACT

The invention relates to a seat, in particular air passenger seat, with seat components, such as a seat part (10) and a backrest (12) with a housing shell (20), which is part of the backrest (12) or which at least partially includes the backrest (12) at the back and which comprises at least two shell parts which are connected to each other, at least in an initial state, via a fixing device and of which the one shell part is moved under a sudden introduction of force, such as, for example, in the event of a crash, relative to the other shell part in such a manner that an engagement space between the shell parts is opened up. This provides a solution in which, in the event of a crash, body parts of the seat user, such as his head, can still impact against shell parts in the backrest region of the seat but a shell part affected to this extent continues to move, without a relatively large amount of resistance, in relation to the other shell part in each case, which is arranged in a stationary manner, in a direction which permits an engagement space to be opened up.

10 Claims, 4 Drawing Sheets

U.S. PATENT DOCUMENTS

| | | | | |
|---|---|---|---|---|
| 4,431,231 A * | 2/1984 | Elazari et al. | ................ | 297/163 |
| 5,437,494 A * | 8/1995 | Beauvais | ................ | 297/216.19 |
| 5,468,045 A * | 11/1995 | Weber | ................ | 297/216.11 |
| 5,857,745 A * | 1/1999 | Matsumiya | ............ | 297/118 X |
| 5,954,401 A * | 9/1999 | Koch et al. | ............ | 297/354.13 |
| 5,992,798 A * | 11/1999 | Ferry | ................ | 244/118.6 |
| 6,003,937 A | 12/1999 | Dutton et al. | | |
| 6,059,364 A * | 5/2000 | Dryburgh et al. | ..... | 244/118.5 X |
| 6,113,183 A * | 9/2000 | Koch et al. | ............ | 297/184.14 |
| 6,119,980 A * | 9/2000 | Ferry | ................ | 244/118.6 X |
| 6,170,786 B1 * | 1/2001 | Park et al. | ................ | 248/274.1 |
| 6,173,921 B1 * | 1/2001 | Neumann et al. | ........ | 244/118.6 |
| 6,209,956 B1 * | 4/2001 | Dryburgh et al. | ..... | 244/118.6 X |
| 6,305,644 B1 * | 10/2001 | Beroth | ................ | 244/118.5 |
| 6,352,309 B1 * | 3/2002 | Beroth | ................ | 297/354.13 |
| 6,634,708 B2 * | 10/2003 | Guenther | ............ | 297/216.11 |
| 6,692,069 B2 * | 2/2004 | Beroth et al. | ............ | 297/118 |
| 6,851,747 B2 * | 2/2005 | Swierczewski | ......... | 297/216.19 |
| 7,188,806 B2 * | 3/2007 | Beroth | ................ | 244/118.6 X |
| 7,318,622 B2 * | 1/2008 | Rezag et al. | ................ | 297/118 |
| 7,360,742 B2 * | 4/2008 | Beroth | ................ | 244/118.5 |
| 7,517,010 B2 * | 4/2009 | Saint-Jalmes et al. | ....... | 297/118 |
| 7,641,278 B2 * | 1/2010 | Strasser et al. | ........... | 297/118 X |
| 2001/0015566 A1 * | 8/2001 | Park et al. | ................ | 297/115 |
| 2003/0085597 A1 * | 5/2003 | Ludeke et al. | .......... | 297/184.14 |
| 2004/0160095 A1 * | 8/2004 | Swierczewski | ......... | 297/216.15 |
| 2007/0029444 A1 * | 2/2007 | Mercier et al. | .......... | 244/122 R |

FOREIGN PATENT DOCUMENTS

| | | | |
|---|---|---|---|
| DE | 4120608 A1 * | 1/1993 | |
| DE | 100 19 484 | 10/2001 | |
| DE | 101 39 763 | 3/2003 | |
| DE | 10 2004 004 874 | 8/2005 | |
| EP | 46469 A1 * | 3/1982 | |
| EP | 581592 A1 * | 2/1994 | |
| EP | 847917 A1 * | 6/1998 | |
| EP | 0 945 302 | 9/1999 | |
| EP | 1 048 509 | 11/2000 | |
| FR | 2645997 A3 * | 10/1990 | |

* cited by examiner

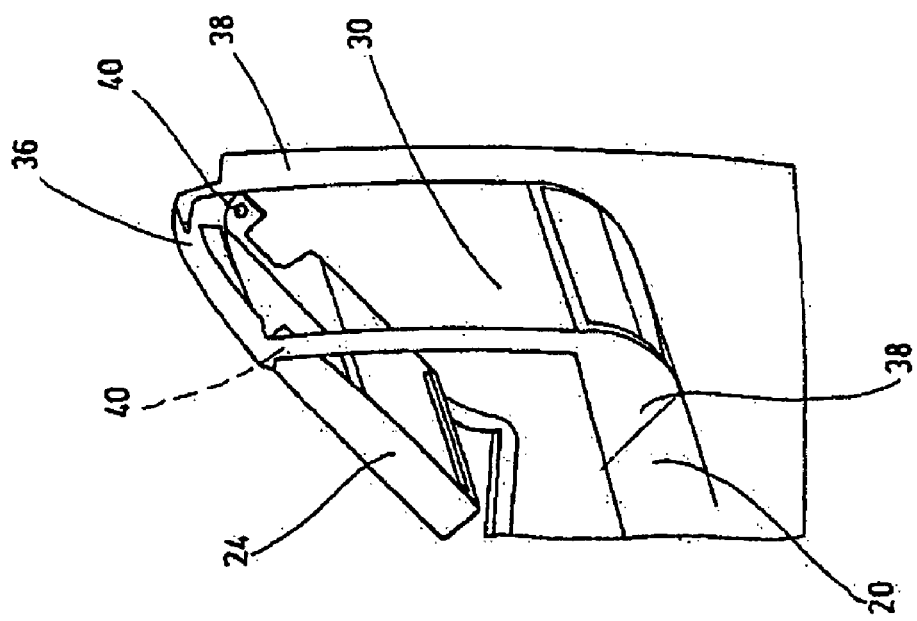
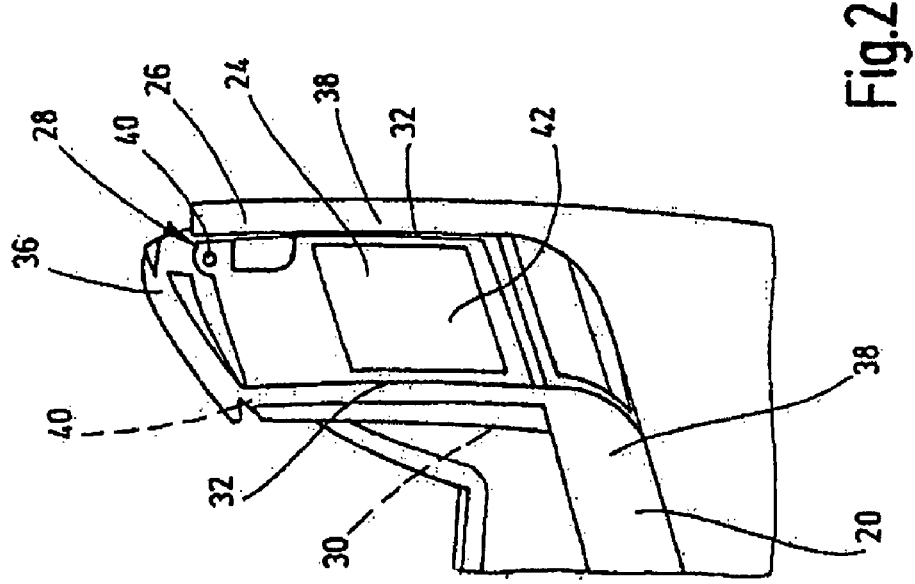
Fig. 2

SEAT, IN PARTICULAR AIR PASSENGER SEAT

The invention relates to a seat, in particular an air passenger seat, having seat components such as a seat part and a backrest and with a housing shell.

Such a seat is detailed, for example, in DE 100 19 484 A1. The known seat is generally used in the business and first class section of aircraft and has individual seat components, in the form of a seat part, a backrest, and a leg rest. Seat components, such as these, can be moved into definable positions by the operator by means of an actuatable supporting framework composed of rods, with which the seat can be installed upright relative to the cabin deck so that in such a way, in addition to an upright sitting position for take-off and landing, comfort or rest positions can also be implemented in which the seat components are arranged relative to one another such that a continuous, flat bed surface is formed. In order to separate the indicated seat kinematics in the form of a supporting framework composed of rods from the vicinity and to be able to ensure a certain measure of a private sphere for the seat occupant, these seat components are surrounded by a type of shell as a housing shell which, predominantly made as a plastic molded part, can have additional functions, for example, can have additional storage space for holding function units such as monitors and the like.

Although these seats in the indicated first class and business class section are arranged spaced relatively far apart from one another in order to provide the highest degree of luxurious travel to the individual, it cannot be precluded that in the event of a crash a seat occupant can be injured on stationary seat components, especially on parts of the inherently rigid housing shells, which, viewed in the direction of flight, generally precede the respective seat occupant in the row of seats. Modern safety standards in fact currently require verification in crash tests that when body parts strike parts of the seat, certain boundary values are not exceeded, the critical value for the head being a so-called HIC (head injury criteria) value of 1000.

In order to keep the HIC value as low as possible in the event of a crash and also to avoid injuries to the seat occupant in other respects in the event of a crash, the known aircraft passenger seat solution as disclosed in U.S. Pat. No. 6,003,937 proposes building the backrest of a seat from several shell parts as a housing shell which, divided in the back area into different sections, compensates for different impact energies in the event of a crash in which in the upper, relevant head impact region a foam-like absorber material is intended to absorb the impact.

EP 0 945 302 A1 discloses another solution of an aircraft passenger seat with a housing shell composed of several shell parts as part of the backrest, of which one, in the event of a crash, moves forward, caused by its mass inertia, and the back shell part initially remains stationary and is designed to absorb the impact energy of body parts, such as that of the head. In this connection, in a type of tracking motion, parts of the rear housing shell can be advanced to the leading shell-like backrest part to reduce the energy.

The known solutions as a component of backrests in aircraft passenger seats allow essentially a potential impact against stationary seat parts in the backrest region, and using absorber materials or allowing defined deformations to reduce the impact energy to a degree such that in any case harmful HIC values exceeding 1000, which could result in death, are prevented.

On the basis of this prior art, the object of the invention is to further improve the known solutions such that in the event of a crash, the risk of possible injury for a seat occupant is still further reduced. This object is achieved by a seat with the features of claim 1 in its entirety.

In that, as specified in the features of claim 1, in the housing shell of the seat which is either a component of the backrest or which at least partially encompasses the backrest to the rear, it consists of at least two shell parts which are connected to one another at least in the initial state via a fastening means, and of which one shell part moves relative to the other shell part when a force is applied suddenly, such as for example in the event of a crash, such that an engagement space between the shell parts is cleared, a solution is devised in which in the event of a crash, body parts of the seat occupant such as his head as shown in the prior art can still strike shell parts in the backrest region of the seat, but that without greater resistance a shell part affected in this way continues to move to the other shell part which is configured to be stationary, in one direction, caused by the impulsive application of force which enables clearance of an engagement space into which the indicated body part, such as the head, can penetrate unobstructed by solid outside parts so that in this respect an unobstructed path is created for the body part. Therefore it cannot come into contact at all with seat parts which are located more or less stationary and which can otherwise lead to considerable injuries with the possible result of death; this is especially the case when the initially indicated HIC boundary values are exceeded.

Since in the described emergency situation direct crash forces are not delivered to the seat structure via the seat occupant, in this respect the seat can be activated again, with the incipient maintenance then in any case the engagement space having to be closed again via a corresponding shell part. The solution according to the invention, by forming an engagement space for body parts such as the head, prevents HIC values, which are dangerously high due to a collision, from occurring at all. The solution according to the invention does not require expensive, additional parts and the basic structure is achieved with parts which would be necessary at any rate for implementation of the backrest or a housing shell which surrounds the backrest at a distance. Accordingly, the solution according to the invention is also economical to implement and the safety concept according to the invention can be easily integrated in an external shell as a housing shell, and in the backrest itself without major structural changes—also as a retrofit kit—in the latter case room is to be made available as required for the engagement space in the adjacent cushion foam.

In one preferred embodiment of the seat according to the invention, provision is made such that in the initial state one shell part is integrated in the other stationary shell part such that at least in the rear region at the locations of the transition between the shell parts a uniform surface can be implemented. In this way, edges or other projecting regions which constitute potential hazards can be avoided, and, additionally, the shape of the rear area of the housing shell of the pertinent seat is aesthetically pleasing. The engagement space to be protected as a safety means is thus covered and a seat occupant, especially a nervous passenger, is not disturbed by the presence of safety means which are otherwise visible.

Preferably it is furthermore provided that in the initial state one shell part toward the back of the housing shell ends flush with the other shell part such that an essentially self-contained top side is formed which follows the remaining contour of the housing shell in the rear region. This yields an inherently contoured, smooth and largely closed surface which has an aesthetic effect and which even outside of a possible crash event helps reduce any risk of injury or obstruction; this occurs especially when, for a row of seats with seats located next to one another transversely to the direction of flight, coming from an aisle, especially with an occupied aisle seat, a seat occupant still needs to get to one of the adjacent seats.

In one especially preferred embodiment of the seat according to the invention, provision is made such that the other shell part has an external, bow-shaped enclosure which, in the direction of the head side, protectively overlaps one shell part. Aside from the indicated protection for one shell part, as a result of the bow-shaped enclosure the stability of the seat is increased, also in the form of a rear shell, so that in any case it is ensured that, when the engagement space is cleared via one shell part, in the event of a crash the seat in terms of its basic structure is preserved and the seat parts cannot unintentionally collapse.

In another preferred embodiment of the seat according to the invention, the fastening means in the initial state keeps one shell part in the other shell part and when a force is applied suddenly, as in the event of a crash, the fastening means releases one shell part to the extent that the engagement space is accessible from the outside. For this purpose the fastening means preferably is made such that in the initial state at the locations of the transition between the shell parts it maintains a uniform surface, that is, does not project over the outline of the housing shell in the rear area, so that the fastening means does not pose an additional risk of injury.

In another preferred embodiment of the seat according to the invention, the fastening means has at least one coupling site which extends through the respectively assignable site of the transition between the shell parts and which coupling site is formed in the manner of a locking or catch means, a scored site or a pivoting means. In this connection, the coupling site can be made such that only at a definable boundary value of impact energy does the safety means trigger with clearance of the engagement space in order in this way to prevent improper triggering.

In another preferred embodiment of the solution according to the invention, at least two coupling sites at the same vertical position, in particular oriented toward the head side of the seat, are made such that they extend through the two opposite sites of the transition between the seat shell parts. In this embodiment, the coupling sites can be formed for example by two articulations. In this way one shell part can be moved in the manner of a swing or rocker when force is applied suddenly and clears the engagement space between the shell parts, but remains connected as a hinge to the other shell part via the indicated articulations.

In another preferred embodiment of the solution according to the invention, one shell part is a module which can be pivoted out, especially in the form of a table unit. In the state of the module pivoted into one shell part, it is released relative to the other shell part by the fastening means, that is, it can be moved for example in the event of a crash; in the state of the module pivoted out, however, the fastening means prevents this release in order to ensure that the safety means does not unintentionally trigger as the engagement space is cleared.

The seat solution according to the invention for its use need not be limited to the application as an aircraft passenger seat, but can also be used in ships, for example in ferry operation or in other modes of travel such as trains or busses.

Other advantageous embodiments of the seat according to the invention are the subject matter of the other dependent claims.

The seat according to the invention will be detailed below using different embodiments in an aircraft passenger seat. The figures are schematic and not to scale.

FIG. 2 shows in a perspective rear representation a safety means which can be used in a seat as shown in FIG. 1, once in the initial state, once in the triggered safety state;

Figure 3:
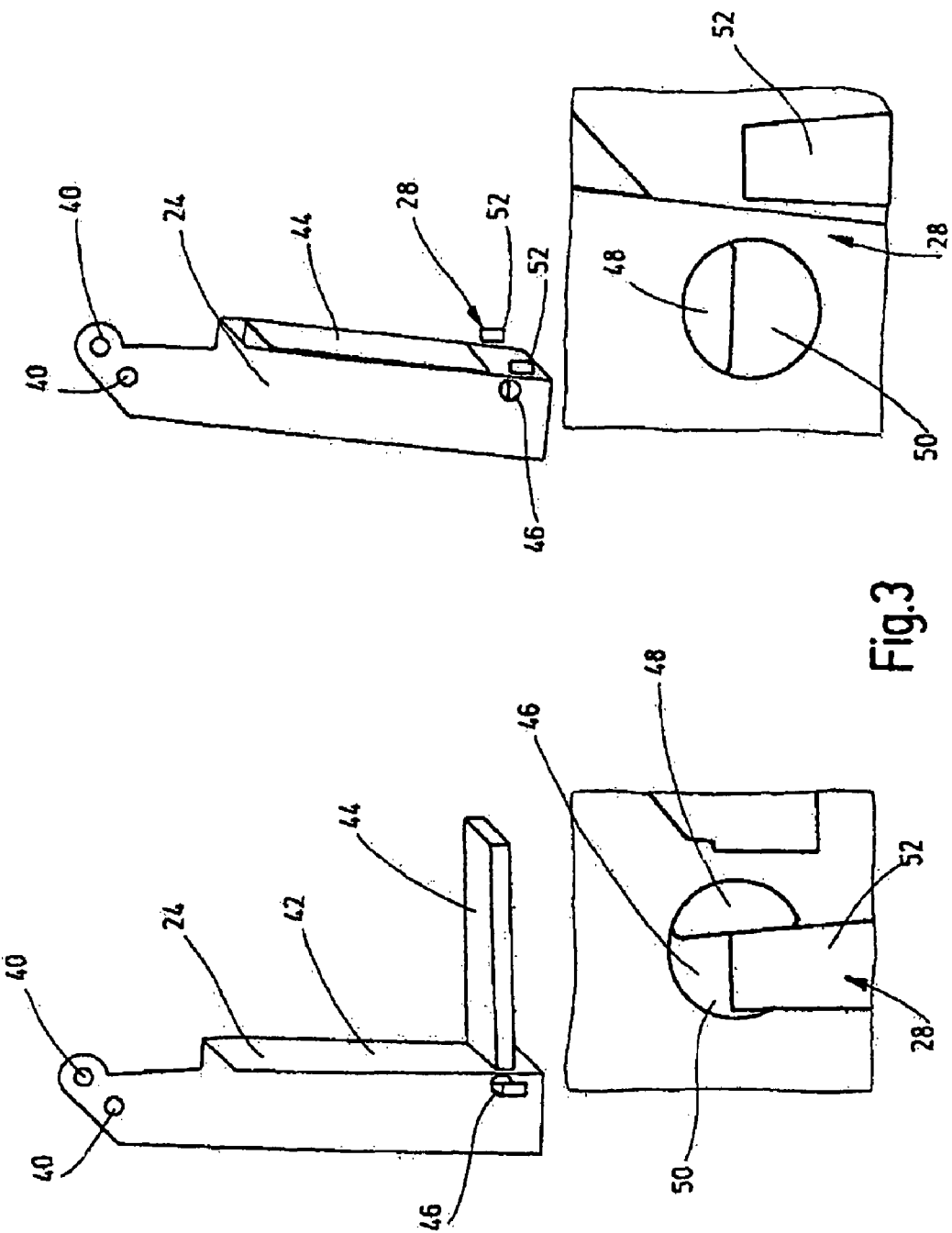
Figure 4:
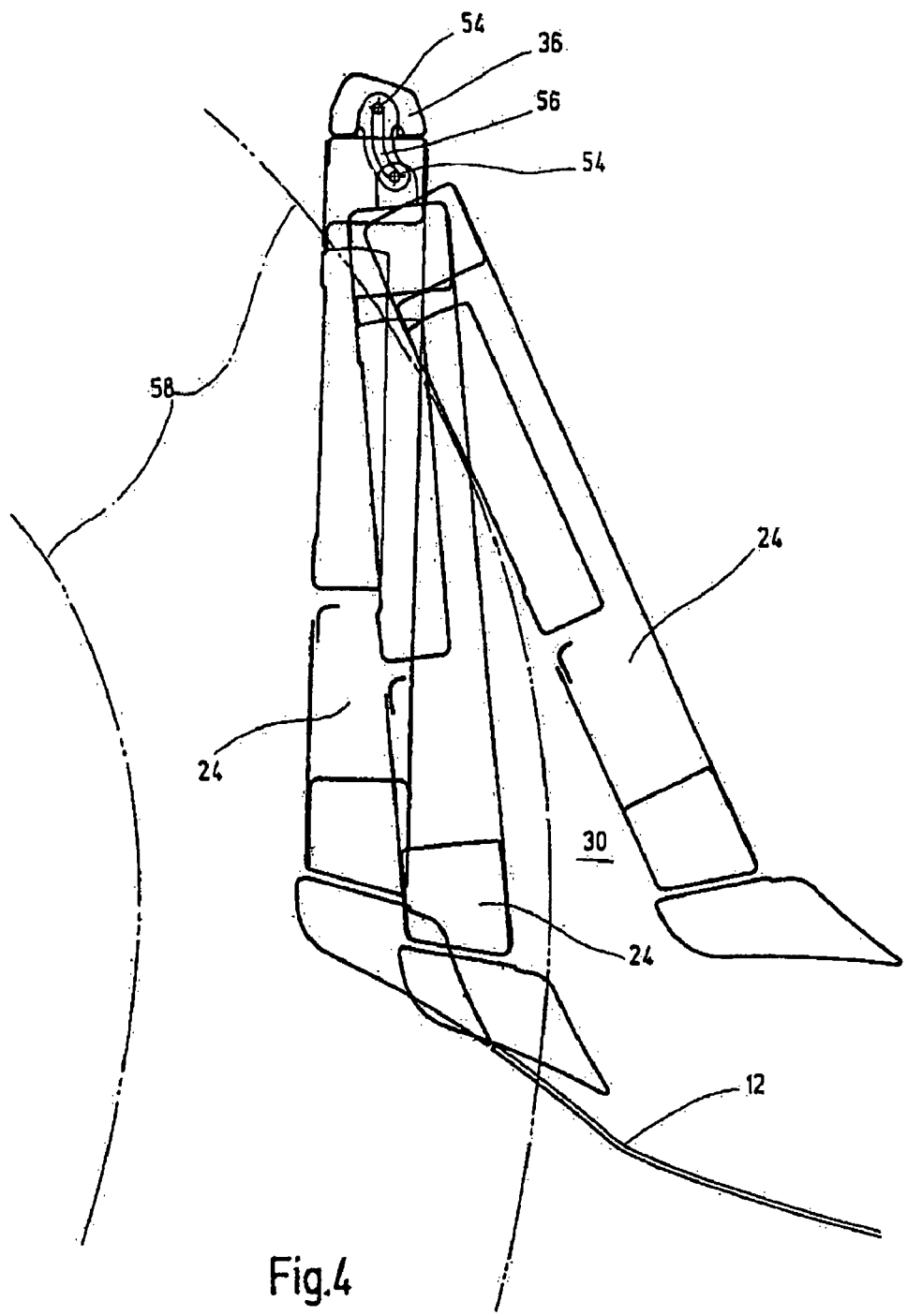

FIG. 3 shows a representation of a modified embodiment of the safety means which corresponds to FIG. 2, for the sake of simplicity the shell parts having been omitted and in the lower half of FIG. 3 a trigger mechanism for the safety means being shown enlarged by way of example; and FIG. 4 shows a representation of another modified embodiment of the safety means which corresponds to FIG. 2 in a schematic side view with a link guide as part of the trigger mechanism.

Figure 1:
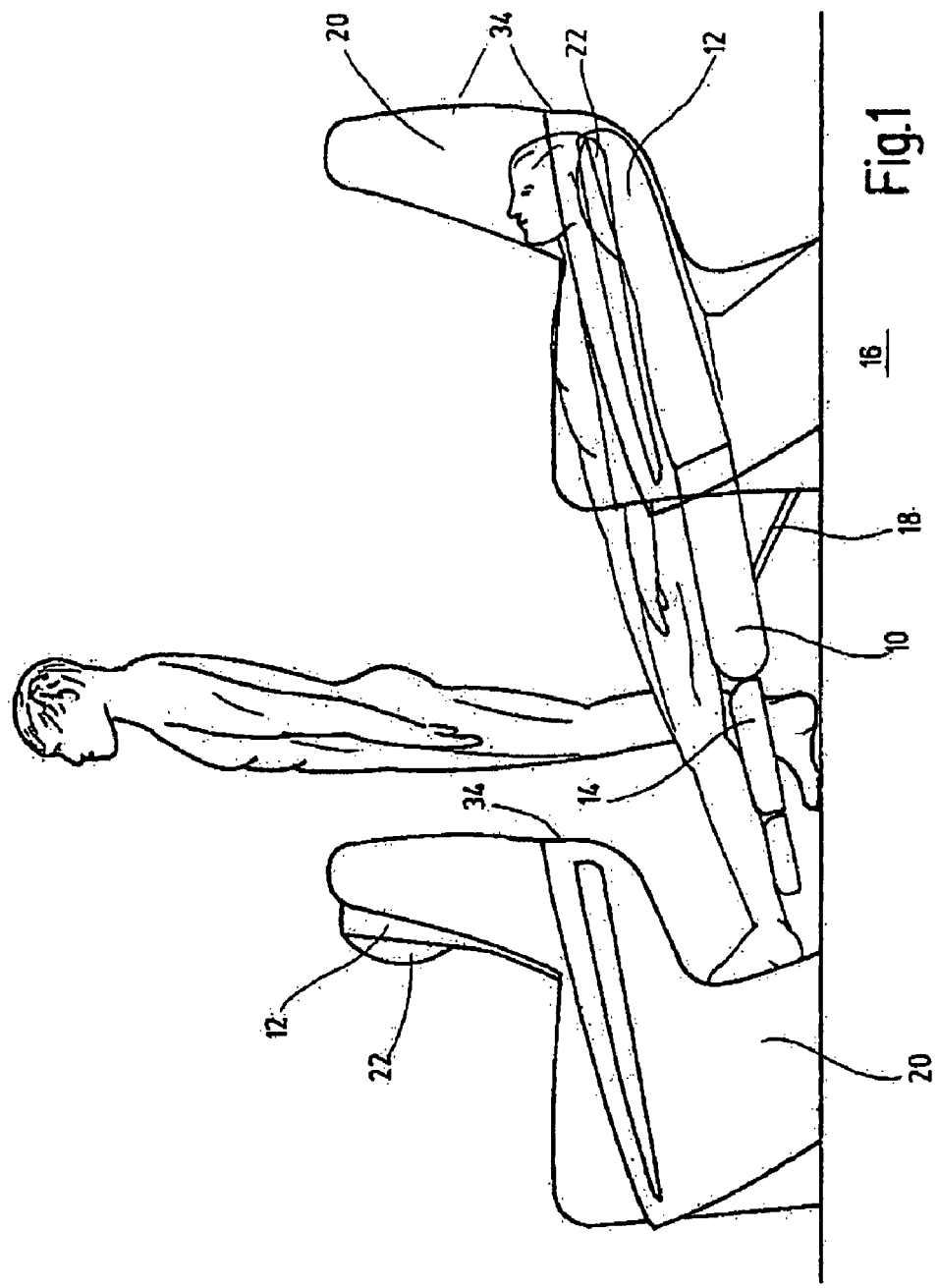
FIG. 1 shows a part of aircraft passenger seating with an aircraft passenger seat, once in an upright seat representation, once in the rest position, a standing and a recumbent seat occupant providing a reference with respect to size ratios and arrangements of the seating.

The respective aircraft passenger seat as shown in FIG. 1 is provided with several seat components, such as a seat part 10, a backrest 12, and a multipart leg rest 14. These seat components are held via an adjustment means to be able to move relative to one another, the adjustment means having several articulations which are connected to one another via a supporting frame composed of rods, which among other things bears the seat part 10 and enables it to be placed upright relative to the cabin deck or vehicle floor 16. Of the pertinent supporting framework composed of rods, as shown in FIG. 1 only one front coupling rod 18 can be seen, and with respect to the other details of the seat kinematics, they are known and disclosed for example in DE 100 19 484 A1. With the seat kinematics it is in any case possible to move the indicated seat components from the initial position as is shown for take-off, landing and taxiing (TTL position), and as is shown at left viewed in the direction of looking at FIG. 1, into a so-called rest or bed position, in which the individual seat components 10, 12, 14 form a reclining surface which runs essentially in a straight line, as shown at right in FIG. 1. Furthermore it is possible to assume, by means of the seat kinematics, intermediate positions, which are not detailed, between the initial position and the sleeping or rest position (not shown).

In order to be able to create a certain amount of privacy and otherwise to shield the indicated seat kinematics relative to the vicinity, the seat is surrounded with a multipart housing shell 20 which in the initial position ends essentially at the same height as the top of the backrest and which toward the front edge of the seat protectively also encompasses the seat part 10 laterally. So that the seat components can move freely within the housing shell 20, in this respect there is a rear distance between the backrest 12 and the housing shell 20 in this region.

For a more detailed explanation of the safety means according to the invention, in the perspective in FIG. 2 only the top end of the housing shell 20 is shown, that is, the region within which the head support 22 which may be provided as shown in FIG. 1 must be moved from its initial position into the rest or sleeping position and vice versa. For the sake of clarity, in FIG. 2 both parts of the multipart housing shell 20 are omitted, and also the cushion and covering material at least partially surrounding them. In the region of interest on the safety means, the housing shell 20 has two shell parts 24, 26 which, at least in the initial state, are connected to one another via a fastening means which is designated as a whole as 28, and of which one shell part 24 is moved relative to the other shell part 26 when a force is applied suddenly, such as for example in the event of a crash, such that an engagement space 30 between the shell parts 24, 26 is cleared (see FIG. 2, right). If the safety means has not triggered, it is therefore in the initial state as shown at left in FIG. 2, one shell part 24 is arranged stationary in the other 26 such that at least in the rear region and at the locations 32 of the transition between the shell parts 24, 26 a uniform surface is implemented. In particular, in the initial state one shell part 24 is arranged toward the back of the housing shell 20 to end flush with the other shell part 26, an essentially self-contained top side is formed which follows the remaining contour 34 of the housing shell 20 in the rear region.

In the upper region the other shell part 26 has an outer, bow-shaped enclosure 36 which thus in the direction of the head side protectively overlaps one shell part 24 and in particular ensures that even in the event of a crash the engagement space 30 is preserved by the bow-like enclosure 36 seeking to keep the two lateral longitudinal walls 38 of the housing shell 20 apart. In this way, collapsing of seat parts, which increases the risk of fatal injury, is largely precluded, since this shell 20 protects the seat with its seat components also in the region of the backrest.

The fastening means 28 keeps one shell part 24 in the other shell part 26 in the initial state, when a force is suddenly applied the fastening means 28 releasing one shell part 24 such that the engagement space 30 is accessible from the outside. In the illustrated embodiment as shown in FIG. 2, the fastening means 28 has two coupling points 40 which extend through the respectively assignable site 32 of the transition between the shell parts 24, 26 and which, designed as a pivoting means, are provided with pivoting journals. In particular, the two indicated coupling points 40 in the form of pivoting journals are arranged opposite at the same vertical location and the pivoting journals are inserted with their one free end stationary in the shell part 26 and the shell part 24 has passages for engagement of the respectively other free end of the pivoting journal in order, as shown in FIG. 1, thus to be able to enable pivoting motion of the shell part 24 clockwise. One shell part 24 is therefore made as a pivoting plate and can be provided with a rectangular recess 42 in the back region to hold a display screen or a monitor. The recess 42 can also be used to hold an absorber material which is not detailed, for example, in the form of soft foam in order in this way to accommodate potential impact forces of body parts of a seat occupant sitting behind and in this way to minimize the risk of injury.

According to the contents of the technical publication "Crash Analysis, Description of Criteria", Version 1.6.1, of the Vehicle Safety Measurement Data Processing Working Group, published in April 2004, available from the Federal Highway Research Institute with headquarters in Bergisch Gladbach, so-called head criteria which are also abbreviated HIC for Head Injury Criterion are described there. This technical publication describes how the pertinent HIC values are obtained in a mathematical exposition, and also gives as the critical HIC boundary value a value of 1000 which should preferably be far from reached in order to avoid serious or even fatal accidents in the event of an aircraft crash.

An approach is taken here by the safety means according to the invention, which provides that in a potential impact of the head of a seat occupant sitting behind, along an impact path against one shell part 24 in the region of the recess 42, it executes around the coupling sites 40 a pivoting motion forward, that is, in the direction of the front of the seat, in order in this way to clear the engagement space 30 which, preferably provided with an absorbing capture material (not shown), brakes and accommodates the impact in the direction of noncritical HIC values. In order to be able to make available a wedge-shaped engagement space 30 as large as possible within the shell part 26, this forward pivoting motion of the shell part 24 should not be obstructed, i.e., in the upright initial seat position (compare FIG. 1) provision can be made so that there is sufficient distance between the rear backrest part and the housing shell 20 in this region in order in this way to make available enough space for the pivoting motion. If the shell parts 24, 26 are to be equipped at least partially with cushion and/or cover materials on the surface side, this configuration should in any case be selected such that after the action of a force in an impact, the shell part 24 can leave its initial position.

In addition to the indicated coupling sites 40, other parts of the fastening means 28, which are not shown, can create additional support, for example, in which one shell part 24 in the lower region via hook and loop fastener strips or the like is connected to the other shell part 26. It can also be basically provided that instead of coupling sites 40 in the form of pivoting journals the fastening means 28 is designed for example as a locking or catch means, a scored site or the like, such that fundamentally even in a linear centrifugal motion, the shell parts 24, 26 can detach from one another. If, in the event of a crash, the seat should not have been exposed to overly high loads, by inserting a new shell part 24 optionally with further replacement of the base shell structure 26, the seat with its external housing shell can be refurbished and in this way re-used.

Furthermore it is possible to insert the replication shown in FIG. 2 not into an external shell as the housing shell 20, but rather to integrate it directly in the region of the backrest 12 into the latter, but the backrest 12 which is not further detailed must then be designed such that the penetration space for the shell part 24 is available in the shell part 26 in order to be able to safely clear the engagement space 30.

In this connection it is also fundamentally possible to make the shell part 24 with a plastic or preferably foam insert which in this respect can ensure safe impact damping, even if the free travel distance for one shell part 24 in the event of a crash should only be small due to the cramped installation conditions in the rear backrest region.

The modified embodiment as shown in FIG. 3 is explained only to the extent that it differs considerably from the subject matter as shown in FIG. 2, for the same components the same reference numbers being used so that in this respect the previous statements also apply analogously to the other, second embodiment. Furthermore, FIG. 3 shows only one shell part 24, and underneath in the enlargement, parts of a modified fastening means designated as a whole as 28.

The modified embodiment as shown in FIG. 3 on the top end for the shell part 24 in turn has two coupling sites 40 by means of which the shell part 24 can be pivoted, and as shown in FIG. 2 is guided in the other shell part 26. In the region of the recess 42 shown there, a module 44 is integrated which in the illustrated embodiment forms a table unit, instead of the table unit also a computer console or the like being possible. In the region in which the module 44 is connected to the shell part 24, there is an articulation means 46 as part of the fastening means 28 which, preferably present on either side of the table module 44 in its pivoted-out state as shown at left in FIG. 3, is provided with a pivoting locking element 48 which prevents one shell part 24 from pivoting into the engagement space 30 in which the respective locking element 48 as a projection of the other rotating journal 50 of the articulation means 46 is in contact with a bridge-like fastening journal 52 which is attached on both sides to the other shell part 26. This prevents the safety function from being unintentionally triggered as described, for example by unintentional impact against a table module 44 which has been pivoted or folded out.

If, as shown at right in FIG. 3, however, the table module 44 is in its pivoted-in position in the recess 42, via the common pivoting axis by pivoting the rotating journal 50 counterclockwise, the respective blocking element 48 is pivoted up by approximately 90 degrees and the opposite fastening journals 52 are released and enable the shell part 24 to be pivoted out, as shown at right in FIG. 2. Since in emergencies, in principle, the tables on passenger seats must be raised, it is understood by the seat occupant that in the pivoted-in position of the module 44 the safety function can also be easily triggered.

FIG. 4 shows in a schematic side view a modified embodiment of the safety means in which the pivoting shell part 24 is shown in three different movement situations, once in an essentially vertically running initial movement situation, once in the fully pivoted-out actuating position, and in the intermediate position. The shell part 24 is guided up in the direction of the bow-shaped enclosure 36 with a pivoting journal 54 in a link guide 56, the pivoting journal 54 being shown twice, once in the upper initial position and once in the lower pivoted-out position in which the engagement space 30 in the structure of the backrest 12 is released. The path of motion 58, which is shown by the broken line, shows the imaginary path of motion of the head in a severe impact of the head against the backrest structure, as can occur in a crash. The result of the illustrated link guide 56, which in its lower region has a curvature which is pointed away from the path 58, is that in the fully pivoted-out position of the shell part 24 the engagement space 30 is increased in volume so that in this way injurious impact of head parts on the backrest structure can be reliably avoided. Due to the curved path of the link guide 56, in addition to the actual pivoting motion around the pivoting journal 54, the shell part 24 viewed also in the longitudinal direction of flight moves away from the seat occupant sitting behind in the event of a crash; this enlarges the survival space relative to the engagement space 30.

The invention claimed is:

1. A seat, in particular an air passenger seat comprising:
   a seat part; and
   a backrest with a housing shell, wherein
   the housing shell at least partially encompasses a rear surface of the backrest,
   the housing shell includes at least a first shell part and a second shell part, which are connected to one another, at least in an initial state, via a fastening device, and
   the first shell part moves relative to the second shell part when a force is suddenly applied, so that an engagement space between the shell parts is created to allow for a movement of a part of a passenger's body that is positioned rearward of the backrest.

2. The seat according to claim 1, wherein the second shell part is stationary, and in the initial state, the first shell part and the second shell part are integrated into the housing shell such that, at least in a rear region and at locations of a transition region between the two shell parts, a uniform surface is established.

3. The seat according to claim 2, wherein the fastening device comprises at least one coupling member, which extends across a location of the transition region between the two shell parts and which is formed as a locking or latching device, a predetermined breaking member, or a pivoting device.

4. The seat according to claim 3, wherein:
   the fastening device comprises at least two coupling members, which are arranged at essentially the same vertical positions, and
   each of the coupling members extends across a location of the transition region between the two shell parts such that the two locations are arranged oppositely to each other.

5. The seat according to claim 2, wherein, in the initial state, the first shell part is flush with the second shell part at the back of the housing shell, such that an essentially self-contained top surface, which follows a contour of the housing shell in the rear region, is formed.

6. The seat according to claim 1, wherein the second shell part, which is stationary, has an external, bow-shaped enclosure, which, in the initial state, protectively overlaps an upper part of the first shell part.

7. The seat according to claim 1, wherein:
   in the initial state, the fastening device retains the first shell part in the second shell part, and
   when a force is suddenly applied, the fastening device releases the first shell part so that the engagement space is accessible from a rear direction.

8. The seat according to claim 1, further comprising:
   a panel device;
   an articulation to pivotally move the panel device between a storage position and an in-use position, and vice versa, wherein:
   in the storage position, the panel device is enclosed by the first shell part,
   in the storage position of the panel device, the fastening device releases a motion of the first shell part relative to the second shell part, and
   at least in the in-use position of the panel device, the fastening device blocks the motion of the first shell part relative to the second shell part.

9. The seat according to claim 8, wherein
   the fastening device includes a pivotal blocking member, which can be pivotally moved by the pivotal motion of the panel device from a blocking position to a released position, and vice versa, and
   the pivotal blocking member interacts with a locking member which is rigidly coupled to the second shell part.

10. The seat according to claim 1, wherein the shell parts are each made either in one piece or are composed of other individual shell parts.

* * * * *